UNITED STATES PATENT OFFICE.

MELCHOR B. MASON, OF NEW YORK, N. Y., ASSIGNOR TO UNITED STATES MINING AND ORE DECOMPOSING COMPANY, OF SAME PLACE.

IMPROVEMENT IN PROCESSES FOR DESULPHURIZING ORES.

Specification forming part of Letters Patent No. 53,742, dated April 3, 1866.

*To all whom it may concern:*

Be it known that I, MELCHOR B. MASON, of the city, county, and State of New York, have invented a new and useful Process for the Desulphurization of Gold, Silver, and Copper Ores; and I do hereby declare the following to be a full, clear, and exact description thereof.

The nature of my invention consists in the intimate combination of lime, (either quick or slaked,) nitrate of soda, or other equivalent alkaline substance with raw ores preparatory to their calcination by heat, for the purpose of effectually absorbing and removing therefrom any sulphur, antimony, phosphorus, arsenic, or other impurities which may be contained therein, and to assist and promote the decomposition of the rock when placed in the furnace.

To effect an intimate combination of the alkali with the ores to be treated, I first pulverize the latter and then mix the ore and lime, or its equivalent, together with water, into a stiff mortar or paste, using a proportion of lime not exceeding one-half of the quantity of pulverized ore. This paste or mortar, when well mixed and sufficiently dry, is then to be calcined in the usual manner in any suitable calcining-furnace, and, finally, if the ore be auriferous or argentiferous, is submitted to the ordinary scouring and amalgamating processes, which it is unnecessary here to describe.

The proportion of the alkali used in combination with the pulverized ore need not exceed twenty per cent., but may be advantageously varied, according to the nature or quality thereof, and I have found by experience that less than ten per cent. may in many cases suffice.

I contemplate, in the treatment of auriferous or argentiferous ores, utilizing the residuum remaining after the precious metals have been extracted therefrom, by pressing and molding the same as it comes from the amalgamator into bricks or blocks of any suitable form and size for building purposes. The blocks thus manufactured will possess, when dry, the firmness, hardness, and durability of stone.

Having thus fully described my improved process for desulphurizing and purifying ores, what I claim therein as new, and desire to secure by Letters Patent, is—

The combination of lime, nitrate of soda, or other equivalent alkaline substance with pulverized or disintegrated ore in a raw condition preparatory to the calcination thereof, all substantially in the manner and for the purpose herein set forth.

Witness my hand this 1st day of September, A. D. 1865.

MELCHOR B. MASON.

In presence of—
 C. S. SLAUSON,
 WILLIAM DELANY.